United States Patent [19]

Mügge et al.

[11] Patent Number: 5,252,647

[45] Date of Patent: Oct. 12, 1993

[54] THERMOPLASTIC MOULDING MATERIALS BASED ON POLYPHENYLENE ETHERS AND POLYAMIDES

[75] Inventors: Joachim Mügge, Haltern; Udo Kowalczik, Bochum; Friedrich G. Schmidt, Haltern, all of Fed. Rep. of Germany

[73] Assignee: Huels Aktiengesellschaft, Marl, Fed. Rep. of Germany

[21] Appl. No.: 793,534

[22] Filed: Nov. 18, 1991

[30] Foreign Application Priority Data

Nov. 16, 1990 [DE] Fed. Rep. of Germany ....... 4036561

[51] Int. Cl.$^5$ .................... C08K 5/10; C08L 51/04
[52] U.S. Cl. .................... 524/280; 524/281; 524/538; 525/68; 525/432
[58] Field of Search ............ 524/280, 281, 538; 525/68

[56] References Cited

U.S. PATENT DOCUMENTS

| | | | |
|---|---|---|---|
| 4,403,056 | 9/1983 | Giolito et al. | 524/280 |
| 4,659,760 | 4/1987 | van der Meer | 524/279 |
| 4,714,729 | 12/1987 | Christy et al. | 524/281 |
| 4,743,640 | 5/1988 | Wirth et al. | 524/280 |
| 4,749,754 | 6/1988 | Gallucci et al. | 525/433 |
| 4,873,276 | 10/1989 | Fujii et al. | 524/279 |
| 5,045,585 | 9/1991 | Bier et al. | 524/280 |
| 5,104,924 | 4/1992 | Goetz et al. | 524/513 |
| 5,109,065 | 4/1992 | Saito et al. | 525/92 |
| 5,115,094 | 5/1992 | Neugebauer | 525/392 |
| 5,122,576 | 6/1992 | White et al. | 525/68 |

FOREIGN PATENT DOCUMENTS

| | | | |
|---|---|---|---|
| 0024120 | 2/1981 | European Pat. Off. | |
| 0295103 | 12/1988 | European Pat. Off. | |
| 0337814 | 10/1989 | European Pat. Off. | |
| 0373900 | 6/1990 | European Pat. Off. | |
| 0066949 | 5/1980 | Japan | 524/281 |
| WO87/00498 | 9/1987 | PCT Int'l Appl. | |

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

A thermoplastic moulding material is prepared by the admixture of a) 3 to 80 parts by weight of polyphenylene ethers,
b) 20 to 97 parts by weight of polyamides,
c) 0.1 to 10 parts by weight of carbonates of the general formula $$X-O-\overset{\overset{\displaystyle O}{\|}}{C}-OY$$

in which X and Y independently of one another denote an alkyl, cycloalkyl, aryl or substituted aryl radical, each having up to 12 C atoms,
d) 0 to 30 parts by weight of impact modifiers and
e) 0 to 75 parts by weight of further polymers, if necessary.

10 Claims, No Drawings

THERMOPLASTIC MOULDING MATERIALS BASED ON POLYPHENYLENE ETHERS AND POLYAMIDES

Polyphenylene ethers (PPE) are industrial high performance thermoplastics having high melt viscosities and softening points. They are suitable for many industrial applications where stability at high temperatures is important (cf. U.S. Pat. Nos. 3,306,874, 3,306,875, 3,257,357, and 3,257,358). Certain properties of polyphenylene ethers are undesirable for industrial applications. For example, mouldings of polyphenylene ethers are brittle owing to poor impact strength.

The high melt viscosities, which lead to difficulties in processing, are also disadvantageous. It should be noted that polyphenylene ethers tend towards instability and discoloration at high temperatures.

Polyphenylene ethers are soluble or swell very greatly in many organic solvents. Consequently, they are unsuitable for applications where they come into contact with such solvents.

It is known that the properties of polyphenylene ether resins can be improved by blending with other polymers. Thus, for example, blends of polyphenylene ethers with high impact polystyrenes have become more important industrially (cf. German Patents 2,119,301 and 2,211,005). These blends can readily be processed to give mouldings having sufficient toughness, but they have the disadvantage that the heat distortion resistance decreases with increasing polystyrene content. In the case of these blends too, the solvent resistance is unsatisfactory.

Although blends of polyphenylene ethers with polyamides have good flow and good solvent resistance (German Offenlegungsschrift 1,694,290 and JP-A-78/47 390), brittle products are generally obtained since the two components are poorly dispersible in one another. Better compatibility of the two phases is achieved by the introduction of functional groups into the polyphenylene ether, for example by means of maleic anhydride in the presence of free radical initiators (Japanese Preliminary Published Application 84/66 452). However, the use of free radical initiators may lead to undesirable and uncontrolled partial gelling of the PPE phase.

It has therefore been proposed to increase the compatibility of the two polymers by adding a sufficient amount of a plasticizer, for example of an organic phosphate (cf. EP-A 0 129 825) or of a diamide (cf. EP-A 0 115 218). Such solutions are not convincing since the improved compatibility has to be obtained at the expense of reduced heat distortion resistance. The same disadvantage is possessed by moulding materials to which copolymers of styrene and unsaturated acid derivatives have been added (cf. EP-A 0 046 040).

European Patent 0,024,120 relates to resin materials which consist of a polyphenylene ether, a polyamide, a third component and, if required, high molecular weight rubber polymers. The third component used is a liquid diene polymer, an epoxide or a compound having a double or triple bond and a functional group (such as, for example, an acid, anhydride, ester, amino or alcohol group). However, the toughness of the resin materials obtained is insufficient for many applications. Furthermore, most of the compatibility-imparting agents mentioned, such as, for example, maleic anhydride, are toxic and highly volatile. Consequently, the operator is subjected to considerable annoyance during processing.

Japanese Preliminary Published Application 84/86 653 describes a process in which 100 parts of polyphenylene ether are grafted with 10 to 300 parts of a mixture of 50 to 99% of styrene and 50 to 1% of unsaturated carboxylic acids or anhydrides thereof by free radical polymerisation. The product is blended with polyamides; although the resulting moulding materials have very good mechanical properties, the heat distortion resistance greatly decreases as a result of the considerable proportion of polystyrene.

WO 85/05 372 describes the introduction of functional groups into polyphenylene ethers by remelting with hydroxypolycarboxylic acids or derivatives thereof. Blending with polyamides gives moulding materials whose elongation at break and notched impact strength values indicate unsatisfactory binding at the phase boundaries. The use of strong organic acids and the presence of water, which is formed during the introduction of functional groups, mean that serious corrosion problems must be expected in continuous operation.

Analogously to this, in WO 86/02 086 functional groups are introduced into a polyphenylene ether by reaction with trimellitic anhydride chloride in solution. Although the blends with polyamides appear to show a better trend than in the previous case, this process has the major disadvantage that either hydrogen chloride is formed or—when a tertiary amine is added—that the polyphenylene ether solution contains considerable amounts of chlorides which, owing to their corrosive effect on machines and on the mould, have to be separated off completely prior to blending. Direct isolation of the polyphenylene ether by stripping off the solvent, which is economically superior to precipitation with methanol, is not possible in this case.

The following may be mentioned as further examples of the modification of the polyphenylene ether in the melt: (EP-A 0 301 004, WO 87/05334, EP-A 0 302 897, EP-A 0 253 123, EP-A 0 302 485, EP-A 0 298 365 and EP-A 299 619).

However, they have the disadvantage that specially prepared substances which are expensive, corrosive or hazardous to health are used. Furthermore, the toughness values are insufficient for many applications. The object of the invention is to avoid these disadvantages and to obtain moulding materials which are readily processible and are suitable for the production of solvent-resistant mouldings having high impact strength and high heat distortion resistance.

SUMMARY OF THE INVENTION

Moulding materials have now been found which meet these requirements and contain the following components:

a) 3 to 80 parts by weight of polyphenylene ethers,
b) 20 to 97 parts by weight of polyamides, the sum of a) and b) giving 100 parts by weight,
c) 0.1 to 10 parts by weight of carbonates of the general formula

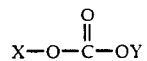

d) 0 to 30 parts by weight of impact modifiers and
e) 0 to 75 parts by weight of further polymers.

DETAILED DESCRIPTION OF PREFERRED EMBODIMENTS

Suitable polyphenylene ethers are polymers which are composed of the following units:

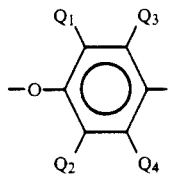

Here, $Q_1$ and $Q_2$ are alkyl radicals having 1 to 10 C atoms, which are preferably primary, cycloalkyl radicals having 5 to 10 C atoms, benzyl radicals having 7 to 10 C atoms or aryl radicals having 6 to 10 atoms. $Q_3$ and $Q_4$ may have the same meaning as $Q_1$ and $Q_2$; however, they preferably denote hydrogen.

These polyphenylene ethers can be prepared by any process corresponding to the prior art. Usually, the corresponding phenols are oxidatively coupled with an oxygen-containing gas, such as, for example, air, in the presence of a catalyst complex. When a phenol halogenated in the para position is used, a sufficient amount of acid acceptor must be present. Preferably used catalysts are copper-amine complexes or manganese-containing systems (German Offenlegungsschrift 3,224,691 and 3,224,692 and U.S. Pat. Nos. 3,306,874, 3,306,875 and 4,028,341). The viscosity numbers J, determined according to DIN 53 728 in chloroform at 25° C., are in the range from 20 to 80 cm$^3$/g (concentration 5 g/l), preferably in the range from 40 to 70 cm$^3$/g.

For the preparation of these polyphenylene ethers, for example, the following monomers can be used: 4-bromo-2,6-dimethylphenol, 2-methyl-6-ethylphenol, 2,6-diethyl-phenol, 2-methyl-6-tert-butylphenol, 4-bromo-2,6-diphenylphenol, 2-benzyl-6-methylphenol, 2,6-dibenzyl-phenol, 2,3,6-trimethylphenol or, preferably, 2,6-dimethylphenol. It is of course also possible to use mixtures of such phenols.

Modified polyphenylene ethers, for example graft copolymers with vinyl monomers, styrene or other modifying reagents, are of course also included.

The polyphenylene ethers can of course also be regulated according to the prior art, for example with 2,4,6-trimethylphenol, 2-(4-hydroxy-3,5-dimethylphenyl)-ethanol, 4-benzyl-2,6-dimethylphenol or tetramethylbisphenol A. However, it should be ensured that, as a result of the regulation, the molecular weight remains sufficiently high to give a viscosity number J in the abovementioned range. In the preferred range, 10 to 70 parts by weight, very particulary preferably 30 to 60 parts by weight, of polyphenylene ether are used.

Suitable polyamides are homo- and copolymers which preferably have an exclusively aliphatic structure. Polyamides 6, 46, 66, 612, 1010, 1012, 11, 12 and 1212 may be mentioned here in particular. The designation of the polyamides corresponds to an international standard in which the first digit(s) specify the number of C atoms of the starting amine and the final digit(s) specify the number of C atoms of the dicarboxylic acid. If only one number is stated, this means that the starting material is an aminocarboxylic acid or a lactam thereof (H. Domininghaus, "Die Kunststoffe und ihre Eigenschaften", VDI Verlag, 1976, page 272). However, mixed aliphatic-aromatic copolyamides are also suitable (cf. U.S. Pat. Nos. 2,071,250, 2,071,251, 2,130,523, 2,130,948, 2,241,322, 2,312,966, 2,512,606, and 3,393,210; Kirk-Othmer, Encyclopedia of Chemical Technology, Vol. 18, John Wiley and Sons (1982), pages 328 and 435). The number average molecular weight of the polyamides should be greater than 5,000, preferably greater than 10,000. In the preferred range, the moulding materials contain 30 to 90 parts by weight, very particularly preferably 40 to 70 parts by weight, of polyamides. The carbonates to be used according to the invention have the general formula

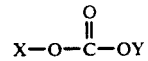

in which X and Y independently of one another denote an alkyl, cycloalkyl, aryl or substituted aryl radical, each having up to 12 C atoms. Carbonates in which X and Y independently of one another denote an alkyl or aryl radical having up to 10 C atoms are preferred. For example, dimethyl carbonate, diethyl carbonate, di-n-butyl carbonate, diphenyl carbonate, bis-(2,4-dichlorophenyl) carbonate, bis-(p-isooctyloxycarbonylphenyl) carbonate, bis-(p-phenylsulphonylphenyl) carbonate or bis-(o-phenylsulphonylphenyl) carbonate can be used. In a preferred embodiment, at least one of the substituents X and Y is an aryl radical.

The moulding materials preferably contain 0.2 to 5.0 parts by weight, particularly preferably 0.5 to 2 parts by weight, of these carbonates.

For example, the following compounds are suitable as impact modifier components which may be present in moulding materials according to the invention: ethylene/propylene copolymers (EPM), ethylene/-propylene/diene terpolymers (EPDM), polypentenylene, polyoctenylene and random or block copolymers of alkenylaromatic compounds with olefins or dienes. In the case of the block copolymers, preferred products are those of styrene with butadiene, isoprene or ethylene/butylene. Tri-block copolymers having terminal polystyrene blocks are very particularly preferred. Compounds of this type are commercially available, for example from Shell Chemical Company under the trade name Kraton ®.

In another preferred embodiment, polyoctenylene is used as the impact modifier component.

Impact modifier components can be functionalised according to the prior art, for example with maleic anhydride, acrylic acid or glycidyl methacrylate, if necessary in the presence of further substances capable of grafting.

Furthermore, other polymers may be present as component e). Styrene polymers, polyesters and/or polycarbonates are particularly suitable here.

The styrene polymers must be compatible with the polyphenylene ethers. For example, the following polymers can be used: crystal-clear polystyrene; copolymers of styrene with other monomers, such as maleic anhydride, acrylic or methacrylic acid derivatives, such as acrylamide, methyl methacrylate or hydroxyethyl methacrylate, maleimides or acrylonitrile; high impact polystyrene (HIPS) or graft products of the copolymers described above on a rubber.

The polyesters contain structural units of the formula

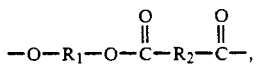

in which $R_1$ is a divalent aliphatic or alicyclic hydrocarbon radical having 2 to 12 and preferably 2 to 8 C atoms and $R_2$ is a divalent aromatic radical having 6 to 20 C atoms.

Suitable diol components here are, for example, ethylene glycol, trimethylene glycol, tetramethylene glycol, hexamethylene glycol, 1,4-cyclohexanedimethanol and neopentylglycol, and suitable dicarboxylic acid components are, for example, isophthalic acid, terephthalic acid, 2,6-, 2,7-, 1,5- and 1,4-naphthalenedicarboxylic acid, diphenic acid and oxydiphenyl-4,4'-dicarboxylic acid. This diol component can be partially replaced in a known manner by a compound

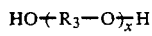

where x is at least 10, $R_3$ denoting a divalent saturated group having 2 to 4 C atoms Equally, a maximum of 20 mol % of the dicarboxylic acid component can be replaced by aliphatic dicarboxylic acids having 2 to 12 C atoms, such as, for example, succinic acid, maleic or fumaric acid, adipic acid, sebacic acid and dodecanedioic acid. These polyesters are usually prepared by condensation of a diol, for example ethylene glycol, 1,4-butanediol or 1,4-cyclohexanedimethanol, with an aromatic dicarboxylic acid, such as, for example, isophthalic or terephthalic acid, or esters thereof. A preferably used polyester is polyethylene terephthalate or polybutylene terephthalate. Processes for the preparation of these polyesters are described in detail in the literature (for example Ullmanns Enzyklopädie der technischen Chemie, 4th Edition, Volume 19, page 61 et seq., and German Offenlegungsschrift 2,407,155 and German Offenlegungsschrift 2,407,156).

Particularly suitable polycarbonates are the aromatic types which are generally known to the skilled worker; cf. for example Kirk-Othmer, Encyclopedia of chemical technology, Vol. 18, John Wiley & Sons (1982), pages 479 to 494. They are obtained by reacting a bisphenol with a carbonate precursor, such as phosgene, a chlorocarbonic ester or a carbonic diester. Typical bisphenols are bisphenol T, tetramethylbisphenol A or tetramethyl-bisphenol S. The preferred polycarbonate is the homopolymer derived from bisphenol A.

In order to avoid masking the properties of the base blend with PPE and polyamide (components a and b) to an excessive extent, the moulding materials preferably contain not more than 50 parts by weight of these further polymers as component e).

The moulding materials may additionally contain small amounts (usually 0 to 0.1 part by weight) of a catalyst. Such catalysts are, for example, aprotic nitrogen bases, such as triethylamine, dimethylaminopyridine or pyridine, or organometallic compounds based on Sn or Ti, such as, for example, Sn(II) isooctanoate, dibutyltin(IV) oxide or titanium tetraisopropylate, or ionic compounds, such as KOH, sodium acetate or sodium phenolate.

The thermoplastic materials according to the invention may additionally contain a flameproofing agent and further additives, such as pigments, oligomers and polymers, antistatic agents, stabilizers and processing auxiliaries, as well as reinforcing agents. The amount of reinforcing agents can be up to 50%, that of flameproofing agents up to 15% and that of all other additives together up to 5%, based in each case on the total moulding material. Particularly suitable flameproofing agents are aromatic phosphorous compounds, such as triphenylphosphine oxide and triphenyl phosphate. A conventional halogen-containing flameproofing agent may also be used. Halogen-containing organic compounds, as described in, for example, the monograph by H. Vogel "Flammfestmachen von Kunststoffen", Hüthig-Verlag, 1966, on pages 94 to 102, are suitable. However, they may also be halogenated polymers, such as, for example, halogenated polyphenylene ethers (see German Offenlegungsschrift 3,334,068) or brominated oligo- or polystyrenes. The compounds should contain more than 30 percent by weight of halogen.

Where halogen-containing flameproofing agents are used, it is advisable to employ a synergistic agent. Compounds of antimony, of boron and of tin are suitable. These are generally used in amounts of 0.5 to 10 percent by weight, based on the thermoplastic materials. Suitable reinforcing agents are, in particular, glass fibres and carbon fibres.

Suitable stabilizers contain organic phosphites, such as, for example, didecyl phenyl phosphite and trilauryl phosphite, sterically hindered phenols and tetramethylpiperidine, benzophenone and triazole derivatives.

Suitable processing auxiliaries are waxes, such as, for example, oxidized hydrocarbons and their alkali metal and alkaline earth metal salts.

These moulding materials are advantageously prepared by mixing these components at temperatures in the range from 220° to 350° C. in the melt in conventional mixing apparatuses, such as, for example, kneaders or extruders.

The moulding materials according to the invention are preferably prepared by first melting and mixing the polyphenylene ethers, if necessary in the presence of a catalyst, of an impact modifier component and/or of a styrene polymer, together with the carbonate. For example, a continuously operating twin-screw kneader having screws rotating in the same direction can be used for this purpose. The melt temperature is between 250° and 350° C., preferably between 290° C. and 330° C. Simultaneous devolatilisation of the melt is advantageous.

In the second step, the polyamide and, if required, the remaining components are incorporated at temperatures between 250° and 350° C., preferably between 280° and 320° C., in a thoroughly kneading mixing unit, such as, for example, a twin-screw extruder containing kneading blocks, preferably with simultaneous devolatilisation of the melt to remove volatile products.

Alternatively, in another procedure, the polyamide can be remelted in a first step with the carbonate and, if required, further components at temperatures between 220° and 350° C., preferably under devolatilisation conditions. In the second step, the polyphenylene ether and, if required, further components are incorporated at temperatures between 250° and 350° C., preferably between 280° and 320° C.

The moulding materials obtained can be processed by the methods conventionally used for processing thermoplastics, such as, for example, injection moulding and extrusion, to give mouldings.

Examples of industrial fields of use are pipes, sheets, housings and other industrial articles for the automotive, electrical and precision engineering sectors.

The viscosity number J of the polyphenylene ether is measured according to DIN 53 728 at 25° C. in chloroform (concentration: 5 g/l). The relative viscosity ($\eta_{rel}$) of the polyamide is measured according to DIN 52 727 at 25° C. in m-cresol.

The notched impact strength ($a_K$) is determined according to ISO 180/4A on Izod bars injection moulded at 290° C.

The elongation at break ($\epsilon_R$) is determined according to DIN 53 455 on dumbbell test specimens injection moulded at 290° C.

Examples

1. The polyphenylene ethers used are
   A1: a poly-(2,6-dimethyl-1,4-phenylene ether) having a J value of 61 cm³/g
   A2: a poly-(2,6-dimethyl-1,4-phenylene ether) having a J value of 52 cm³/g
2. The polyamide component used is
   B: VESTAMID ®X4887 (Hüls AG), a polyamide 12 having a $\eta_{rel}$ value of 1.9
3. The impact modifiers used are
   C1: KRATON ® G 1650 (Shell Chem. Co.)
   C2: VESTENAMER ® 8012 (Hüls AG)
4. The carbonate used is
   D: diphenyl carbonate
5. The catalyst used is
   E: 4-N,N-dimethylaminopyridine The parts by weight stated in the Tables below for the individual components are melted, mixed and granulated in a Berstorff ZE 25 twin-screw extruder. To remove volatile components, the melt is devolatilised by applying reduced pressure.

The premixes A 11 - A 16 and A 21 - A 23 and B 11 in Table 1 are obtained at a temperature of 300° C., a screw speed of 100 min⁻¹ and a melt throughput of 2.5 kg/h.

The moulding materials 1-9 according to the invention and the Comparative Experiments V1-V2 are obtained at 290° C., 250 min⁻¹ and 3 kg/h.

TABLE 1

| Components used | Premix | | | | | | | | | |
|---|---|---|---|---|---|---|---|---|---|---|
| | A 11 | A 12 | A 13 | A 14 | A 15 | A 16 | A 21 | A 22 | A 23 | B 11 |
| A 1 | 100 | 100 | 100 | 100 | 90 | 90 | — | — | — | — |
| A 2 | — | — | — | — | — | — | 100 | 100 | 100 | — |
| B | — | — | — | — | — | — | — | — | — | 100 |
| C 2 | — | — | — | — | 10 | 10 | — | — | — | — |
| D | 1 | 2 | 5 | 10 | — | 2 | 10 | 2 | 2 | 1.3 |
| E | — | — | — | — | — | — | — | — | 0.02 | — |

TABLE 2

| Components used | Premix | | | | | | | | | | |
|---|---|---|---|---|---|---|---|---|---|---|---|
| | 1 | 2 | 3 | 4 | 5 | 6 | 7 | V1 | V2 | 8 | 9 |
| A 1 | | | | | | | | 40 | | | 40 |
| A 11 | 40 | | | | | | | | | | |
| A 12 | | 40 | | | | | | | | | |
| A 13 | | | 40 | | | | | | | | |
| A 14 | | | | 40 | | | | | | | |
| A 15 | | | | | | | | | 40 | | |
| A 16 | | | | | | | | | | 40 | |
| A 21 | | | | | 40 | | | | | | |
| A 22 | | | | | | 40 | | | | | |
| A 23 | | | | | | | 40 | | | | |
| B 11 | | | | | | | | | | | 60 |
| B | 60 | 60 | 60 | 60 | 60 | 60 | 60 | 60 | 60 | 60 | |
| C 1 | 10 | 10 | 10 | 10 | 10 | 10 | 10 | 10 | | | 10 |
| $a_K$ | 39 | 39 | 18 | 16 | 20 | 24 | 37 | 8 | 4 | 28 | 15 |
| $\epsilon_R$ | 165 | 171 | 115 | 88 | 123 | 100 | 156 | 6 | 4 | 143 | 60 |

V1, V2: Comarative Examples not according to the invention

What is claimed is:

1. A thermoplastic moulding material which comprises:
   a) 3 to 80 parts by weight of a polyphenylene ether,
   b) 20 to 97 parts by weight of a polyamide, wherein the sum of a) and b) equals 100 parts by weight,
   c) 0.1 to 10 parts by weight of a carbonate of the formula

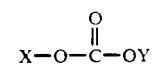

in which X and Y independent of one another denote an alkyl, cycloalkyl, aryl or substituted aryl radical, each having up to 12 C atoms, and
   d) 0 to 30 parts by weight of an impact modifier.

2. The thermoplastic moulding material of claim 1 wherein component a) is a polyphenylene ether based on 2,6-dimethylphenol.

3. The thermoplastic moulding material of claim 1 wherein at least one of the substituents X and Y of component c) is an aryl radical.

4. The thermoplastic moulding material of claim 3, wherein the carbonate is diphenyl carbonate.

5. The thermoplastic moulding material of claim 1, wherein component d) is a tri-block copolymer having terminal polystyrene blocks or is polyoctenylene.

6. The thermoplastic moulding material of claim 1, wherein a component e) is admixed therewith which is selected from the group consisting of styrene polymer, polyester and polycarbonate in an amount of up to 75 parts by weight.

7. A process for the preparation of a moulding material of claim 1, wherein the components specified in claim 1 are melted and mixed at a temperature in the range from 220° to 350° C. to generate said moulding material.

8. The process of claim 7, wherein the polyphenylene ether is melted and mixed with the said carbonate at a temperature between 250° and 350° C., after which the polyamide is incorporated therein at a temperature between 250° and 350° C.

9. The process of claim 7, wherein the said polyamide is melted and mixed with the said carbonate at a temperature between 200° and 350° C. and, thereafter, the polyphenylene ether is incorporated therein at a temperature between 250° and 350° C.

10. A moulding produced from the moulding material of claim 1.

* * * * *